(12) United States Patent
Sevellec et al.

(10) Patent No.: US 10,195,710 B2
(45) Date of Patent: Feb. 5, 2019

(54) METHOD FOR MANUFACTURING IN SERIES OPTICAL GRADE POLISHING TOOLS

(71) Applicant: DELAMARE SOVRA, Mantes-la-Jolie (FR)

(72) Inventors: Ludivine Sevellec, Mantes-la-Jolie (FR); Arnauld Rogue, Mantes-la-Jolie (FR)

(73) Assignee: DELAMARE SOVRA SAS, Mantes-la-Jolie (FR)

( * ) Notice: Subject to any disclaimer, the term of this patent is extended or adjusted under 35 U.S.C. 154(b) by 6 days.

(21) Appl. No.: 15/654,867

(22) Filed: Jul. 20, 2017

(65) Prior Publication Data

US 2018/0021913 A1    Jan. 25, 2018

(30) Foreign Application Priority Data

Jul. 21, 2016 (EP) ..................... 16305939

(51) Int. Cl.
| | |
|---|---|
| *B24B 13/00* | (2006.01) |
| *B24D 9/08* | (2006.01) |
| *B32B 37/12* | (2006.01) |
| *B24B 13/01* | (2006.01) |
| *B24B 9/14* | (2006.01) |
| *B24B 37/22* | (2012.01) |
| *B24D 18/00* | (2006.01) |
| *B24B 13/005* | (2006.01) |

(Continued)

(52) U.S. Cl.
CPC .............. *B24B 13/012* (2013.01); *B24B 9/02* (2013.01); *B24B 9/14* (2013.01); *B24B 13/00* (2013.01);

(Continued)

(58) Field of Classification Search
CPC ..... B24B 13/00; B24B 13/02; B24B 13/0037; B24B 13/005; B24B 13/01; B24B 13/012; B24B 37/22; B24D 9/14; B24D 9/08; B24D 9/085; B24D 13/14; B24D 13/147; B24D 18/00; B24D 18/0072; B24D 18/0009; B32B 7/12; B32B 37/12; B32B 37/1284

(Continued)

(56) References Cited

U.S. PATENT DOCUMENTS

| | | | |
|---|---|---|---|
| 6,179,950 B1 * | 1/2001 | Zhang ..................... | B24B 37/11 156/258 |
| 8,500,934 B2 * | 8/2013 | Cady ....................... | B24B 37/20 156/214 |

(Continued)

FOREIGN PATENT DOCUMENTS

| | | |
|---|---|---|
| DE | 10 2014 015 052 A1 | 4/2016 |
| EP | 1 787 752 A1 | 5/2007 |

(Continued)

OTHER PUBLICATIONS

European Search Report, dated Mar. 2, 2017, from corresponding EP application No. 16 30 5939.

*Primary Examiner* — Eileen Morgan
(74) *Attorney, Agent, or Firm* — Young & Thompson

(57) ABSTRACT

Disclosed is a method that includes a step of applying glue including carrying out with a pad printing machine a sequence of steps in which is driven a transfer pad from a glue taking position to an applying position in which the distal surface of the transfer pad is in contact with one surface of one component of the tool; and then carrying out again at least once the sequence of steps, whereby the glue is applied at least twice onto the one surface of one component.

20 Claims, 5 Drawing Sheets

(51) Int. Cl.
  *B24B 9/02* (2006.01)
  *B24B 13/02* (2006.01)
  *B24D 9/10* (2006.01)
  *B32B 7/12* (2006.01)

(52) U.S. Cl.
  CPC ........ *B24B 13/005* (2013.01); *B24B 13/0043* (2013.01); *B24B 13/01* (2013.01); *B24B 13/02* (2013.01); *B24B 37/22* (2013.01); *B24D 9/08* (2013.01); *B24D 9/085* (2013.01); *B24D 9/10* (2013.01); *B24D 18/00* (2013.01); *B24D 18/0009* (2013.01); *B32B 7/12* (2013.01); *B32B 37/1284* (2013.01)

(58) Field of Classification Search
  USPC ................ 451/490, 530, 531, 533, 538, 539
  See application file for complete search history.

(56) References Cited

U.S. PATENT DOCUMENTS

| | | | |
|---|---|---|---|
| 8,672,730 B2* | 3/2014 | McAllister | B24B 13/00 451/265 |
| 2003/0017783 A1* | 1/2003 | Bernard | B24B 13/01 451/5 |
| 2005/0101235 A1 | 5/2005 | Huguet | |
| 2005/0189065 A1* | 9/2005 | Boldizar | B24B 37/205 156/250 |
| 2008/0047301 A1* | 2/2008 | Dursteler Lopez | B24B 13/02 65/61 |
| 2008/0171502 A1 | 7/2008 | Stephane et al. | |
| 2009/0170416 A1* | 7/2009 | Cady | B24B 37/20 451/548 |
| 2010/0178858 A1* | 7/2010 | Stephane | B24B 13/02 451/490 |
| 2011/0136416 A1 | 6/2011 | Meynen | |
| 2012/0164921 A1* | 6/2012 | McAllister | B24B 9/14 451/28 |
| 2014/0256230 A1* | 9/2014 | Repper | B24B 37/205 451/41 |
| 2015/0174725 A1* | 6/2015 | Kimura | B24B 37/22 451/41 |

FOREIGN PATENT DOCUMENTS

| | | |
|---|---|---|
| EP | 2 662 185 A1 | 11/2013 |
| FR | 2 834 662 A1 | 7/2003 |
| FR | 2 900 356 A1 | 11/2007 |
| JP | 2000-317797 A | 11/2000 |

\* cited by examiner

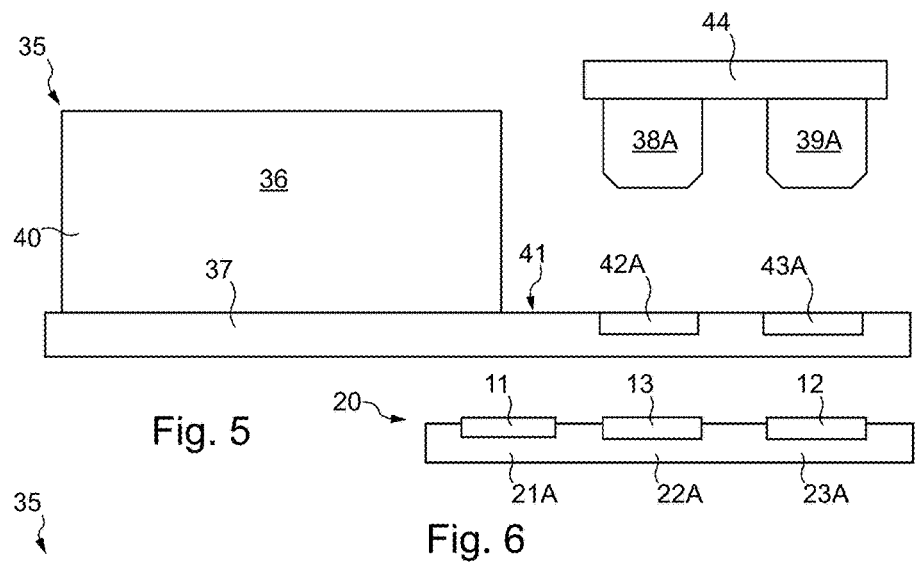
Fig. 5
Fig. 6
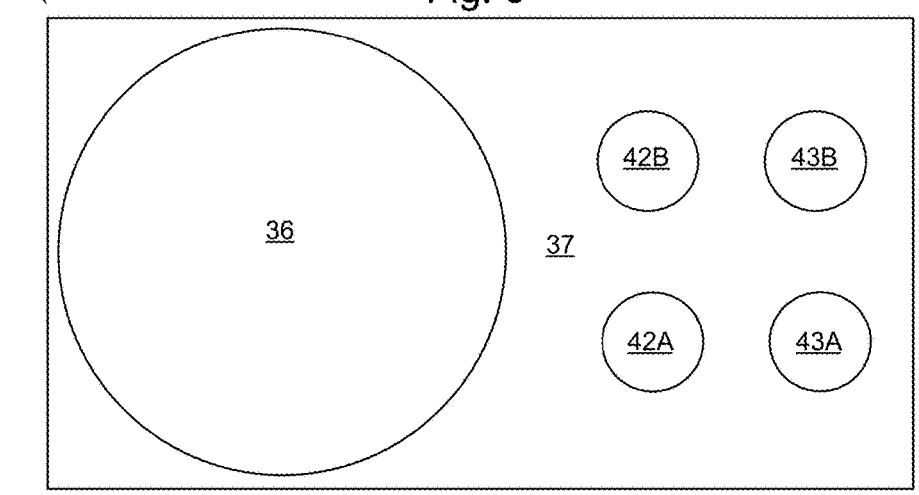
Fig. 7

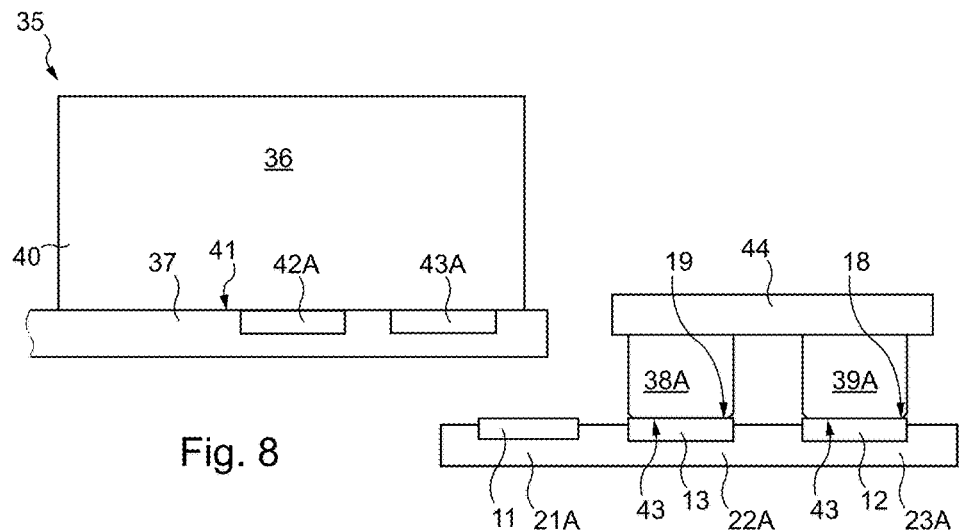
Fig. 8
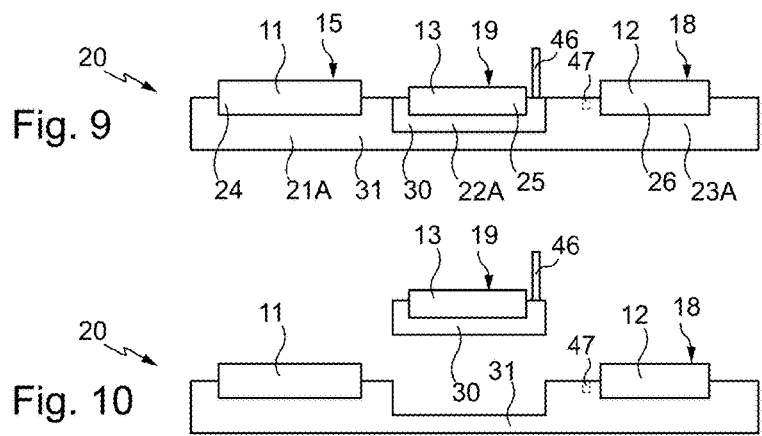
Fig. 9
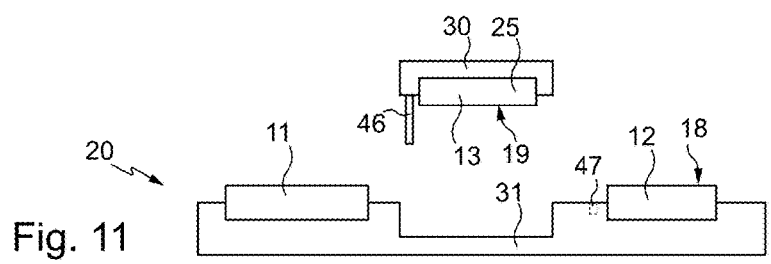
Fig. 10
Fig. 11

METHOD FOR MANUFACTURING IN SERIES OPTICAL GRADE POLISHING TOOLS

FIELD OF THE INVENTION

The invention relates to optical grade surfacing, for surfaces such as a face of an ophthalmic lens, a camera lens or a lens of an instrument for observing distant objects or a face of a semiconductor substrate.

The term "surfacing" means any operation aiming to modify the condition of a surface previously formed. This includes polishing, grinding or frosting operations aiming to modify (decrease or increase) the roughness of the surface and/or to reduce its unevenness.

BACKGROUND ART

There is already known, in particular from Japanese patent application 2000-317797, French patent application 2 834 662, to which US patent application 2005/0101235 corresponds, and French patent application 2 900 356, to which US patent application 2008/0171502 corresponds, a tool for surfacing an optical surface including: a base configured to be coupled to a polishing machine, a polishing pad configured to be pressed against a surface to be worked and an elastically compressible body sandwiched between the base and the polishing pad, the body and the base being attached one another, and the body and the polishing pad being attached one another.

In general, the base forms or includes a rigid support and the polishing pad is flexible.

SUMMARY OF THE INVENTION

The invention is directed to a method for manufacturing such a polishing tool which is simple, convenient and economic to carry out while producing high quality polishing tools.

The invention accordingly provides a method for manufacturing in series optical grade polishing tools each including a base configured to be coupled to a polishing machine, a polishing pad configured to be pressed against a surface to be worked and an elastically compressible body attached to the base and attached to the polishing pad with said body sandwiched between the base and the polishing pad; said method including for each said tool the step of attaching said body to said base and the step of attaching said body to said polishing pad; characterized in that at least one of said step of attaching said body to said base and said step of attaching said body to said polishing pad includes a step of applying glue in which glue is applied onto one surface of one component and then includes a step of pressing in which said one surface of one component and one surface of another component are applied on each other, said one component and said another component being one of: said base and said body, said body and said base, said body and said polishing pad, and said polishing pad and said body;

said method further including:
the step of providing a supporting device including a support configured for receiving said one component;
the step of providing a pad printing machine having a reservoir, a cliché and a transfer pad; and
the step of filling said reservoir with liquid glue;
said step of applying glue including:
placing said one component into said support;
carrying out with said machine the following sequence of steps: driving the reservoir and cliché relative to one another from a rest position in which the reservoir is over an etched area of the cliché to a working position, in which the reservoir is away from the etched area; then driving the transfer pad to a taking position in which the distal surface of the transfer pad is in contact with the etched area of the cliché; and then driving the transfer pad from the taking position to an applying position in which the distal surface of the transfer pad is in contact with said one surface of said one component; and
then carrying out again at least once said sequence of steps, whereby said glue is applied at least twice onto said one surface of one component.

In the method according to the invention, the transfer pad takes a film of glue from the etched area of the cliché and then applies the just taken film of glue to the one surface of the one component (for instance the elastically compressible body). Then the same sequence of steps is carried out at least once so that at least two films of glue are applied onto the one surface of the one component.

The inventors have indeed found that it is quite possible in practice that the film of glue deposited during one sequence of steps is not taken out by the transfer pad when it leaves the one surface of the one component at the end of the next sequence of steps because in practice the time between the moment at which the transfer pad has left the one surface during one sequence and the moment at which the transfer pad reaches the one surface during the next sequence is long enough for enabling the film of glue deposited at the first step to dry sufficiently for having a viscosity high enough for preventing the transfer pad to absorb it.

When later the step of pressing is carried out, the one surface of the one component (for instance the elastically compressible body) and the one surface of the another component (for instance the polishing pad) are applied onto each other, this attaches together the one component (for instance the elastically compressible body) and the other component (for instance the polishing pad), the glue deposited on the one surface of the one component forming a layer of glue attaching the one component and the other component.

This layer of glue is formed by the combination of the at least two films of glue deposited by the transfer pad.

The fact that the layer of glue attaching the one component and the other component is formed by the combination of the at least two films deposited by the transfer pad enables together an excellent cooperation of the transfer pad with the cliché and an excellent cooperation of the glue with the one component and the another component to be attached one another, despite the fact that the requirements as to the amount of the glue are contradictory: an excellent cooperation of the transfer pad with the cliché requires most often that a relatively small amount of glue is taken by the transfer pad; and an excellent cooperation of the glue with the one component and the another component to be attached one another requires most often to deposit between these components a relatively large amount of glue.

It is noted in this connection that in the method according to the invention, the one component and the another component include the elastically compressible body, which most often requires a relatively large amount of glue because it is most often a foam prone to absorb liquids placed at its surface.

In other respects, in the method according to the invention, the fact that a pad printing machine is used for depositing films of glue enables to achieve an excellent control of the glue thickness, and therefore excellent performance as to the quality of the produced tools and in terms of reproducibility, while a pad printing machine is relatively simple, convenient and economic to implement and to use.

According to advantageous features:

said glue is a polyurethane glue and said sequence of steps is carried out three times successively;

said glue is a neoprene glue and said sequence of steps is carried out four times successively;

said glue applied onto said one surface of one component is left exposed to air for a time in the range of 2 to 4 seconds between each moment at which the transfer pad leaves said applying position and a successive moment at which the transfer pad arrives at said applying position;

said transfer pad is driven along a same direction to said taking position and to said applying position;

said etched area and said support are aligned in said taking position along said same direction;

said supporting device includes another support configured for receiving said another component;

said supporting device further includes a still another support configured for receiving a remaining component of said tool, said remaining component being the one amongst the base, the elastically compressible body and the polishing pad which is not said one component and which is not said another component;

said supporting device further includes a further support and a further another support configured for receiving a further component and a further another component, said further component and said further another component being components of a tool to be manufactured different from the tool to be manufactured with said one component and said another component; and/or said supporting device further includes a still another support, a further support, a further another support and a further still another support; said still another support being configured for receiving a remaining component of said tool, said remaining component being the one amongst the base, the elastically compressible body and the polishing pad which is not said one component and which is not said another component; said further support, further another support and further still another support being configured for receiving a further component, a further another component and a further still another component; said further component, further another component and further still another component being components of a tool to be manufactured different from the tool to be manufactured with said one component, said another component and said still another component.

BRIEF DESCRIPTION OF THE DRAWINGS

The description of the invention continues now with a detailed description of preferred embodiments given hereinafter by way of non-limiting illustration and with reference to the appended drawings. In the drawings:

FIG. 5 is a view similar to FIG. 3 but with the cliché and reservoir of the machine in working position rather than in rest position;

FIG. 6 is a top view of the reservoir and cliché in working position;

FIG. 7 is a view similar to FIG. 5 but with the transfer pads in a glue taking position;

FIG. 8 is a view similar to FIG. 3 but with the transfer pads in a glue applying position;

FIG. 9 is a side view of the tray illustrated in FIG. 2 with components of tools placed in the supports as in FIGS. 3, 5, 7 and 8 but more detailed; and FIGS. 10 to 15 are views similar to FIG. 9 showing successive steps of assembling two components of the tools.

DETAILED DESCRIPTION OF PREFERRED EMBODIMENTS

Figure 1:
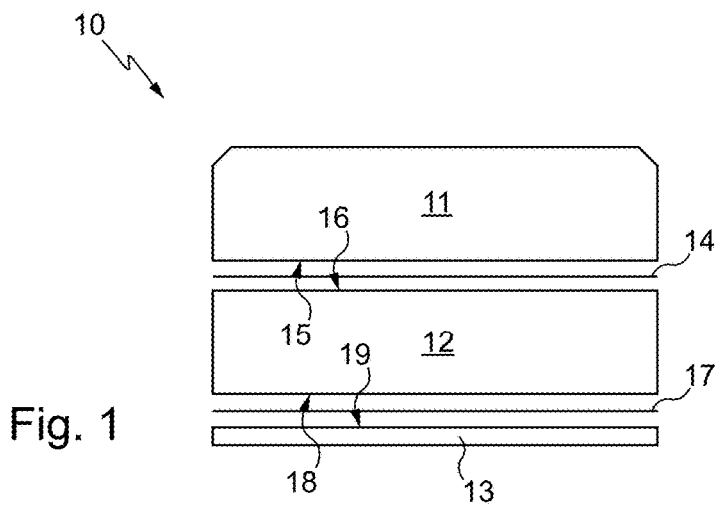
FIG. 1 is a schematic exploded view of a conventional polishing tool.

The conventional polishing tool 10 illustrated in FIG. 1 includes a base 11, an elastically compressible body 12 and a polishing pad 13.

The base 11 is configured to be coupled to a polishing machine. The polishing pad 13 is configured to be pressed against a surface to be worked.

The body 12 is sandwiched between the base 11 and the polishing pad 13. The body 12 is attached to the base 11 and to the polishing pad 13.

The base 11 and the body 12 are attached thanks to a layer 14 of glue disposed between the surface 15 of the base 11 and the surface 16 of the body 12 that faces one another; and the body 12 and the polishing pad 13 are attached thanks to a layer 17 of glue disposed between the surface 18 of the body 12 and the surface 19 of the polishing pad that faces one another.

The manufacturing in series of polishing tools 10 according to the invention is described in the following.

For attaching the body 12 and the polishing pad 13, liquid glue is deposited onto the surface 18 of the body 12 and onto the surface 19 of the polishing pad 13; and the body 12 and the polishing pad 13 are pressed so that the surface 18 and the surface 19 are applied on each other. The layer 17 of glue is formed by the glue deposited onto the surface 18 and the glue deposited onto the surface 19.

For attaching the base 11 and the body 12, liquid glue is deposited onto the surface 15 of the base 11 and then the base 11 and the body 12 are pressed so that the surface 15 on which glue is deposited and the surface 16 of the body 12 are applied on each other. The layer 14 of glue is formed by the glue deposited onto the surface 15.

Figure 2:
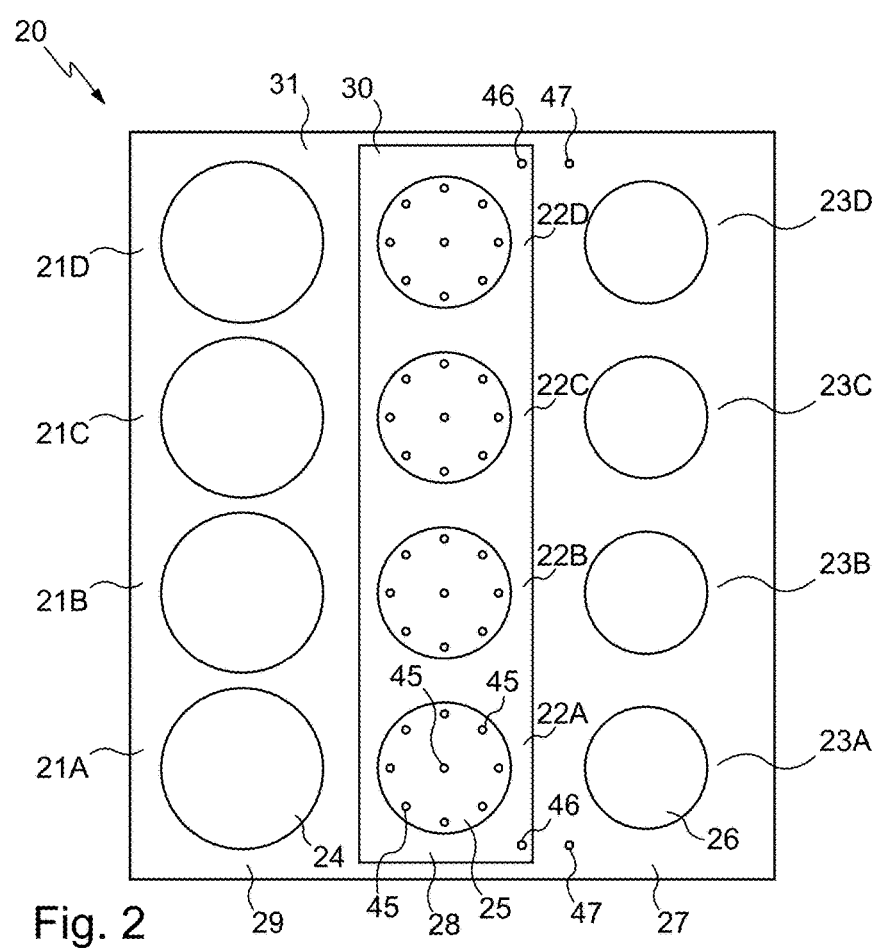
FIG. 2 is a schematic top view of a tray involved in the manufacturing in series of such tools according to the invention.

FIG. 2 shows a tray 20 configured for receiving the components needed for manufacturing a plurality of tools 10, that is for each tool a base 11, a body 12 and a polishing pad 13.

Here the tray 20 can receive the components needed for manufacturing four tools 10.

Figure 3:
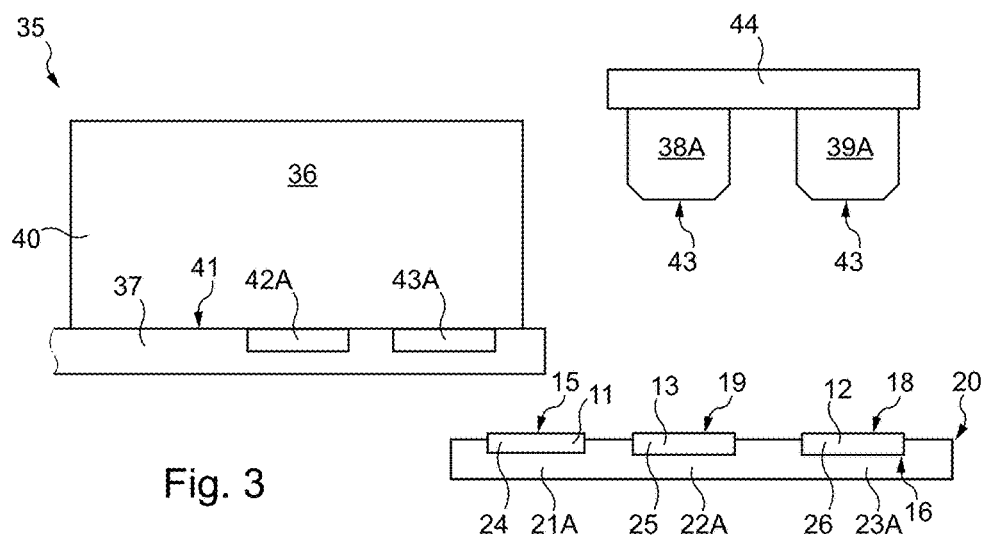
FIG. 3 is a schematic side view of a pad printing machine with which glue is applied to components placed in the tray illustrated in FIG. 2, said machine being in waiting condition.

The tray 20 is arranged as a matrix of twelve supports 21A, 22A, 23A, 21B, 22B, 23B, 21C, 22C, 23C, 21D, 22D and 23D each delimiting a cavity in which a tool component can be introduced while leaving exposed one of its surface to be applied onto the surface of another component (see for instance FIG. 3).

Each support having a reference starting with 21 delimits a cavity 24 configured for receiving a base 11. Each support having a reference starting with 22 delimits a cavity 25 configured for receiving a polishing pad 13. Each support having a reference starting with 23 delimits a cavity 26 configured for receiving a body 12.

The matrix arrangement of the supports of the tray 20 has, as seen in FIG. 2, four lines (supports having a reference ending respectively with A, B, C and D) and three columns (supports having a reference starting respectively with 21, 22 and 23).

Each line is for the three components of one tool.

In the tray 20, the supports having a reference starting with 23 (column seen at the right) form a supporting member 27, used for the bodies 12; the supports having a reference starting with 22 (column seen at the middle) form a supporting member 28, used for the polishing pads 13; and the supports having a reference starting with 21 (column seen at the left) form a supporting member 29, used for the bases 11.

The supporting member 28 makes part of a removable portion 30 of the tray 20. The supporting members 27 and 29 make part of a fixed portion 31 of the tray 20.

The removable portion 30 has a nominal position illustrated on FIGS. 2, 3, 5, 7, 8, 9 and 15 where it is in the fixed portion 31 of the tray 20. The removable portion 30 can be driven to the positions illustrated on FIGS. 10 to 14 where it is away from the fixed portion 31.

This will be explained later in more details with reference to FIGS. 9 to 15.

The tray 20 follows a circuit having a first station in which the components of the tools are placed in the supports; then a second station in which glue is deposited onto the surface 18 of the bodies 12 and onto the surface 19 of the polishing pads 13; and then a third station in which the bodies 12 and the polishing pads 13 are pressed so that for each tool the surface 18 and the surface 19 are applied on each other.

FIGS. 3 to 8 show steps carried out in the second station. FIGS. 9 to 15 show steps carried out in the third station.

In other stations downstream of the third station, glue is deposited onto the surface 15 of the base 11; and then for each tool the assembly made in the third station (body 12 and polishing pad 13 attached one another) and the base 11 are pressed so that the surface 15 on which glue is deposited and the surface 16 of the body 12 are applied on each other.

The steps carried out in the second station will now be described with reference to FIGS. 3 to 8.

In the second station, there is a pad printing machine 35 having a reservoir 36, a cliché 37 and transfer pads 38A, 39A, 38B and 39B.

The reservoir 36 is filled with liquid glue 40.

The cliché 37 has a top surface 41 which is planar with etched areas 42A, 43A, 42B and 43B which are slightly recessed.

The cliché 37 is mobile in translation between the rest position shown on FIGS. 3 and 8 and the working position shown on FIGS. 5, 6 and 7.

In the rest position, the reservoir 36 is over the etched areas 42A, 43A, 42B and 43B. In the working position, the reservoir is away from the etched areas 42A, 43A, 42B and 43B, which are each full of glue.

In the working position, each transfer pad 38A, 39A, 38B and 39B can be driven to a glue taking position (FIG. 7) where its distal surface 43 is in contact with respectively the etched areas 42A, the etched area 43A, the etched area 42B and the etched area 43B.

Figure 4:
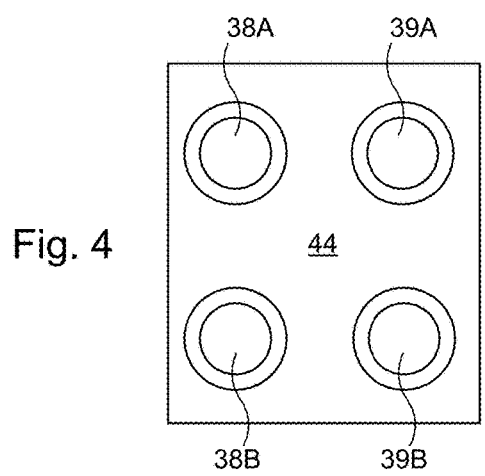
FIG. 4 is a bottom view of the transfer pad assembly of the machine illustrated on FIG. 3.

As seen from FIGS. 4 and 6, the arrangement of the etched areas 42A, 43A, 42B and 43B relative to one another is the same as the arrangement of the transfer pads 38A, 39A, 38B and 39B relative to one another.

The transfer pads 38A, 39A, 38B and 39B are mounted on a plate 44 through which the transfer pads are driven. The transfer pads are thus driven simultaneously.

As seen from FIGS. 2 and 4, the arrangement of the cavities of the supports 22A, 23A, 22B and 23B relative to one another is the same as the arrangement of the transfer pads 38A, 39A, 38B and 39B relative to one another; and the arrangement of the cavities of the supports 22C, 23C, 22C and 23D relative to one another is the same as the arrangement of the transfer pads 38A, 39A, 38B and 39B relative to one another.

In the second station, the tray 20 can take a first position in which each transfer pad 38A, 39A, 38B and 39B can be driven to a glue applying position (FIG. 8) where its distal surface 43 is in contact with respectively the surface 19 of the polishing pad 13 received in the support 22A, the surface 18 of the body 12 received in the support 23A, the surface 19 of the polishing pad 13 received in the support 22B and the surface 18 of the body 12 received in the support 23B.

The tray 20 can also take a second position offset from the first position so that the supports 22C, 23C, 22D and 23D are in the same location as respectively the support 22A, the support 23A, the support 22B and the support 23B in the first position.

Thus, when the tray 20 is in the second position, each transfer pad 38A, 39A, 38B and 39B can be driven to the glue applying position (FIG. 8) where its distal surface 43 is in contact with respectively the surface 19 of the polishing pad 13 received in the support 22C, the surface 18 of the body 12 received in the support 23C, the surface 19 of the polishing pad 13 received in the support 22D and the surface 18 of the body 12 received in the support 23D.

The sequence of steps carried out with the machine 35 and the tray 20 in which the tool components 11, 12 and 13 are received will be now described.

Initially, when the tray 20 is placed in the first position, the machine 20 is in the waiting condition shown on FIG. 3 where the reservoir 36 and cliché 37 are in the rest position and the set of transfer pads 38A, 39A, 38B and 39B in a home position away from the cliché 37 and from the tray 20.

The cliché 37 is then driven to the working position while the set of transfer pads remains in home position, as shown on FIG. 5.

The set of transfer pads 38A, 39A, 38B and 39B is then driven to the glue taking position, as shown on FIG. 7, then the set of transfer pads is driven away from the cliché 37, then the cliché 37 is driven back to the rest position, then the set of transfer pads is driven to the glue applying position shown on FIG. 8, then the set of transfer pads is driven back to the home position.

During this sequence of steps, glue is applied simultaneously onto the surface 18 of the body 12 and onto the surface 19 of the polishing pad 13.

Then a second cycle is carried out with the same sequence of steps as from the waiting condition (FIG. 3): the cliché 37 is driven to the working position (FIG. 5), the set of transfer pads is then driven to the glue taking position (FIG. 7), then the set of transfer pads is driven away from the cliché 37, then the cliché 37 is driven back to the rest position, then the set of transfer pads is driven to the glue applying position (FIG. 8) and then the set of transfer pads is driven back to the home position.

During these two sequences of steps, glue is applied simultaneously a first time onto the surface 18 of the body 12 and onto the surface 19 of the polishing pad 13 and then a second time onto the surface 18 of the body 12 and onto the surface 19 of the polishing pad 13.

The film of glue deposited during the first sequence of steps is not taken out by the transfer pad when it leaves the surface 18 or 19 at the end of the second sequence of steps because in practice the time between the moment at which the transfer pad has left the surface 18 or 19 during the first sequence and the moment at which the transfer pad reaches the surface 18 or 19 during the second sequence is long enough for enabling the film of glue deposited at the first sequence to dry sufficiently for having a viscosity high enough for preventing the transfer pad to absorb it.

It should be noted that between these two moments the surface 18 or 19 is left exposed to air.

For instance, good results are obtained with the time between each moment at which the transfer pad leaves the applying position and a successive moment at which the transfer pad arrives at the applying position in the range of 2 to 4 seconds.

Of course, more than two successive sequences of steps can be carried out, according to the circumstances.

For instance, good results are obtained when the glue is a polyurethane glue with three successive sequences of steps; and when the glue is a neoprene glue with four successive sequences of steps.

It should be noted that, as seen on FIGS. 5 and 7, the etched areas 42A, 43A, 42B and 43B are aligned with the supports 22A, 23A, 22B and 23B, respectively. This enables the driving of the transfer pads 38A, 39A, 38B and 39B along the same direction as well to the glue taking position (FIG. 7) and to the glue applying position (FIG. 8).

Of course, the diameter of the distal surface 43 of the transfer pads and the diameter of the etched areas 42A, 43A, 42B and 43B are similar to the diameter of the surfaces 18 and 19 onto which glue is to be applied.

At this stage, in the tray 20, glue is deposited on the surface 18 of each body 12 and on the surface 19 of each polishing pad 13.

The tray 20 proceeds then to the third station where, as mentioned above, the bodies 12 and the polishing pads 13 are pressed so that for each tool the surface 18 and the surface 19 are applied on each other.

The steps carried out in the third station will now be described with reference to FIGS. 9 to 15.

In the third station, there is a manipulating device for manipulating the removable portion 30 of the tray 20, and thus the supporting member 28 which makes part of the removable portion 30.

As mentioned above, the removable portion 30 has a nominal position illustrated on FIGS. 2, 3, 5, 7, 8, 9 and 15 where it is in the fixed portion 31 of the tray 20; and the removable portion 30 can be driven to the positions illustrated on FIGS. 10 to 14 where it is away from the fixed portion 31.

This driving of the removable portion 30 is carried out by the manipulating device in the third station. The manipulating device also has a suction source for holding the components received in the supporting member 28, here the polishing pads 13.

The manipulating device has for instance two arms each having a tip that can be coupled mechanically to a respective lateral side of the removable portion 30 with the tip of one of the arms which is also coupled pneumatically with the removable portion.

In the description given below only the supports 23A and 22A are mentioned but this description also applies if references 23A and 22A are replaced by 23B and 22B, 23C and 22C, or 23D and 22D.

As seen on FIG. 2, in the nominal position of the removable portion 30, the support 23A of the supporting member 27 and the support 22A of the supporting member 28 are side by side, the cavity 26 of the support 23A and the cavity 25 of the support 22A opening towards a same direction, here the upwards direction.

Accordingly, as seen for instance on FIG. 9, in the nominal position of the removable portion 30, the surface 18 of the body 12 received in the support 23A and the surface 19 of the body 12 received in the support 22A are turned to the same direction, here the upwards direction.

Figure 12:
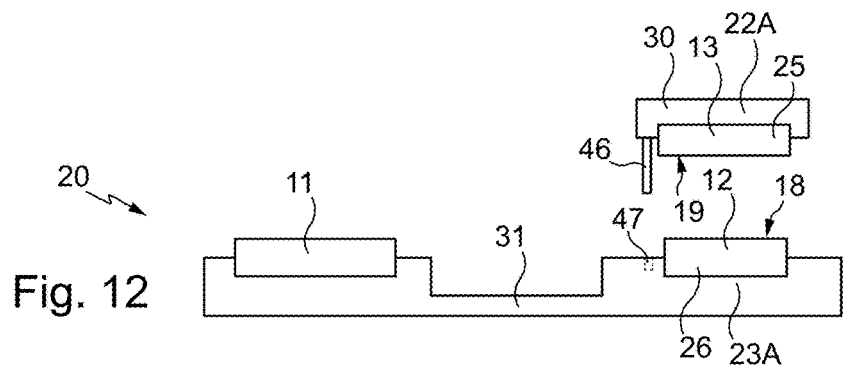

In the position of the removable portion 30 shown on FIG. 12, the support 23A and the support 22A are aligned, the cavity 26 of the support 23A and the cavity 25 of the support 22A being coaxial or substantially coaxial and opening towards each other.

Here the cavity 26 opens towards the upwards direction and the cavity 25 opens towards the downwards direction.

Accordingly, in the position of the removable portion 30 shown on FIG. 12 the surface 18 of the body 12 received in the support 23A and the surface 19 of the polishing pad 13 received in the 22A are aligned and face each other; and here the surface 18 is turned to the upwards direction and the surface 19 is turned to the downwards direction.

Figure 13:
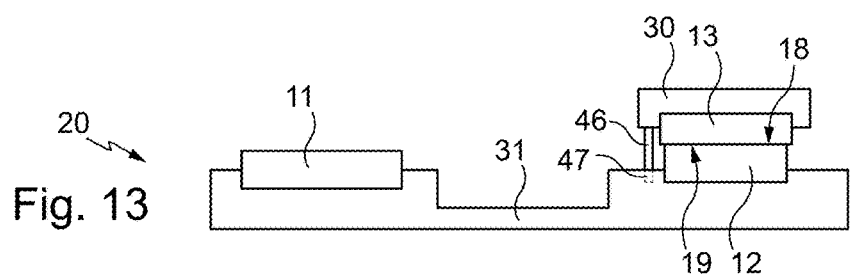
Figure 14:
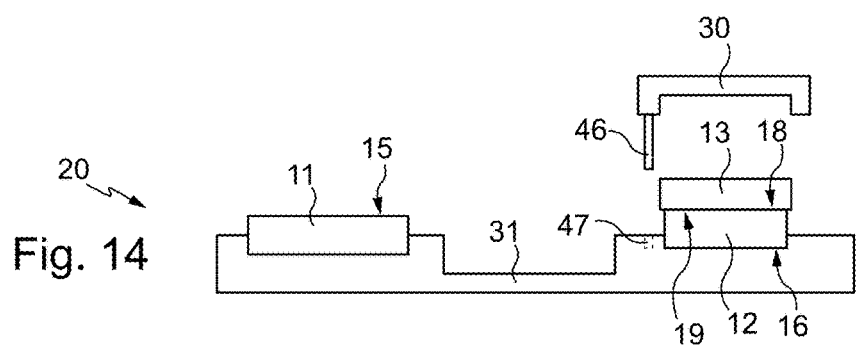
Figure 15:
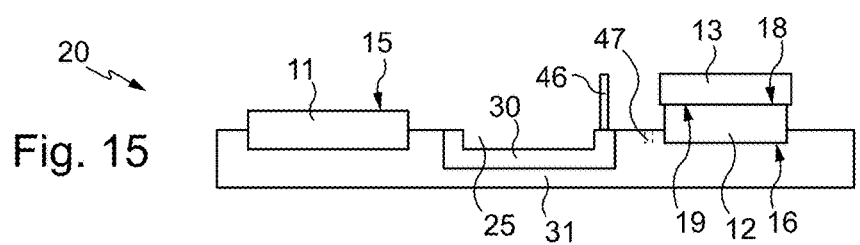

In the position of the removable portion 30 shown on FIG. 13, the supporting member 27 and the supporting member 28 are pressed towards one another so that the surfaces 18 and 19 are applied onto each other.

For preventing the polishing pad 13 received in the support 23A to move with respect to the support 23A when the removable portion 30 is manipulated, and in particular for preventing the polishing pad 13 from falling down when the cavity 25 of the support 23A opens towards the downwards direction, the polishing pad 13 is held in the support 23A.

In the drawn example, the holding of the polishing pad 13 is carried out by suction through holes 45 (FIG. 2) in a wall delimiting the cavity 25, here the wall facing the opening of cavity 25.

For assuring that the surfaces 18 and 19 are register when applied one another as shown on FIG. 13, the removable portion 30 and the fixed portion 31 include complementary male and female positioning members 46 and 47.

Here, the male positioning members 46 are on the removable portion 30 and the female positioning members 47 are on the fixed portion 31.

The sequence of steps carried out with the tray 20 and the manipulating device in the third station will be now described.

Initially, in the tray 20 the removable portion 30 is in the nominal position in the fixed portion 31, glue has been deposited onto the surface 18 of the body 12 received in the support 23A and onto the surface 19 of the polishing pad 13 received in the support 22A.

The manipulating device couples with the removable portion 30 and applies suction through the holes 45 for holding the polishing pad 13. Then, the manipulating device lifts vertically the removable portion 30, which is thus driven transversely to the fixed portion 31 of the tray 20, up to the position shown on FIG. 10. Then, the manipulating device turns over the removable portion 30 which thus takes the position shown on FIG. 11 where the cavity 25 opens downwardly; and accordingly the surface 19 of the polishing pad 13 is turned downwardly. Then, the manipulating device translates horizontally the removable portion 30 up to the position shown on FIG. 12 and then the manipulating device lowers vertically the removable portion 30 up to the position shown on FIG. 13 which is maintained a time sufficient for achieving the complete attaching of the polishing pad 13 and the body 12. Then, the manipulating device releases the suction so that the polishing pad 13 is no longer held in the support 22A. Then, the manipulating device drives the removable portion 30 to the fixed portion 31 along the same path but in the reverse order: as shown on FIG. 14 the removable portion 30 is translated vertically up to the same position as in FIG. 12, then translated horizontally up to the same position as in FIG. 11, then turned over up to the same position as in FIG. 10 and then translated vertically up to the nominal position in the fixed portion 31, as shown on FIG. 15.

The tray 20 may then proceeds to further station(s) downstream of the third station, in which glue is deposited onto the surface 15 of the base 11; and then for each tool the assembly made in the third station (body 12 and polishing pad 13 attached one another) and the base 11 are pressed so that the surface 15 on which glue is deposited and the surface 16 of the body 12 are applied on each other.

It should be noted that the assembly made in the third station (body 12 and polishing pad 13 attached one another) is relatively easy to manipulate automatically in the further station(s) so that the surface 16 of the body 12 is applied onto the surface 15 of the base 11, because there is no need to turn over the assembly (the surface 15 is turned upwardly and the surface 16 is turned downwardly).

It should be noted that for being easy to be drawn and understood, the drawings are very schematic. In particular, the thicknesses of the drawn elements are not to scale.

In not drawn variants:
the tray 20 configured for the manufacturing of four tools is replaced by a supporting device configured for the manufacturing of a single tool or a number of tools different from four, for instance six tools; of course, the number of supports in the supporting device, the number of transfer pads and the number of etched areas in the cliché are configured according to the number of tool(s) selected for being manufactured in the supporting device;
the tray 20 having for each tool being manufactured a support for each of its three components is replaced by a supporting device having only two supports for each tool being manufactured; these two supports are each for a component of a tool; or one of the support is for two components that are already attached and the other support is for the remaining component, for instance one of the supports is for the body 12 and the polishing pad 13 already attached one another and the other support is for the base 11 with the glue being applied simultaneously to one surface of the body 12 (the surface that is on the opposite side to the side attached to the polishing pad) and one surface of the base 11;
instead of having glue applied at least twice simultaneously onto the body 12 and the polishing pad 13, glue is applied at least twice on only one component with this one component and another component involved in a step of pressing in which the surface of the one component on which glue has been applied at least twice and one surface of the another component are applied on each other, said one component and said another component being one of: the base 11 and the body 12, the body 12 and the base 11, the body 12 and the polishing pad 13, and the polishing pad 13 and the body 12 (it should be noted that the one component and the another component are not necessarily alone in the support where they are placed, for instance the body 12 can be placed in the support together with the polishing pad 13 to which it is already attached, the polishing pad 13 being located on the bottom of the support); of course, in these not drawn variants, there is only one transfer pad for each tool being manufactured;
the step of pressing is carried out differently, for instance without the supporting device such as the tray 20; and/or
the supporting device having the supports for the components of the tool has no removable portion such as 30 (for instance, the body or bodies 12 are manipulated individually for carrying out the pressing step); and/or the supporting device is different from a tray (for instance a turntable).

Numerous other variants are possible according to the circumstances and it is reminded in this respect that the invention is not limited to the described and drawn embodiments.

The invention claimed is:

1. A method for manufacturing in series optical grade polishing tools (10) each including a base (11) configured to be coupled to a polishing machine, a polishing pad (13) configured to be pressed against a surface to be worked and an elastically compressible body (12) attached to the base (11) and attached to polishing pad (13) with said body (12) sandwiched between the base (11) and the polishing pad (13); said method including for each said tool (10) the step of attaching said body (12) to said base (11) and the step of attaching said body (12) to said polishing pad (13); wherein at least one of said step of attaching said body (12) to said base (11) and said step of attaching said body (12) to said polishing pad (13) includes a step of applying glue in which glue is applied onto one surface of one component and then includes a step of pressing in which said one surface of one component and one surface of another component are applied on each other, said one component and said another component being one of: said base (11) and said body (12), said body (12) and said base (11), said body (12) and said polishing pad (13), and said polishing pad (13) and said body (12);
said method further including:
the step of providing a supporting device (20) including a support (23A-23D, 22A-22D) configured for receiving said one component;
the step of providing a pad printing machine (35) having a reservoir (36), a cliché (37) and a transfer pad (38A, 39A, 38B, 39B); and
the step of filling said reservoir (36) with liquid glue (40);
said step of applying glue including:
placing said one component into said support (23A-23D, 22A-22D);
carrying out with said machine (35) the following sequence of steps: driving the reservoir (36) and cliché (37) relative to one another from a rest position in which the reservoir (36) is over, and releases the liquid glue into, an etched area (42A, 43A, 42B, 43B) of the cliché to a working position, in which the reservoir (36) is away from the etched area (42A, 43A, 42B, 43B); then driving the transfer pad (38A, 39A, 38B, 39B) to a glue taking position in which the distal surface (43) of the transfer pad is in contact with the glue of the etched area of the cliché; and then driving the transfer pad from the glue taking position to a glue applying position in which the glue of the distal surface (43) of the transfer pad is in contact with said one surface of said one component; and then carrying out again at least once said sequence of steps, whereby said glue is applied at least twice onto said one surface of one component.

2. A method according to claim 1, wherein said glue is a polyurethane glue and said sequence of steps is carried out three times successively.

3. A method according to claim 1, wherein said glue is a neoprene glue and said sequence of steps is carried out four times successively.

4. A method according to any claim 1, wherein said glue applied onto said one surface of one component is left exposed to air for a time in the range of 2 to 4 seconds between each moment at which the transfer pad leaves said glue applying position and a successive moment at which the transfer pad arrives at said glue applying position.

5. A method according to any claim 1, wherein said transfer pad (38A, 39A, 38B, 39B) is driven along a same direction to said glue taking position and to said glue applying position.

6. A method according to claim 5, wherein said etched area (42A, 43A, 42B, 43B) and said support (23A-23D, 22A-22D) are aligned in said glue taking position along said same direction.

7. A method according to claim 1, wherein said supporting device (20) includes another support configured for receiving said another component.

8. A method according to claim 7, wherein said supporting device (20) further includes a still another support (21A-21D) configured for receiving a remaining component of said tool (10), said remaining component being the one amongst the base (11), the elastically compressible body (12) and the polishing pad (13) which is not said one component and which is not said another component.

9. A method according to claim 7, wherein said supporting device (20) further includes a further support (23A-23D, 22A-22D) and a further another support (23A-23D, 22A-22D) configured for receiving a further component and a further another component, said further component and said further another component being components of a tool to be manufactured different from the tool to be manufactured with said one component and said another component.

10. A method according to claim 7, wherein said supporting device (20) further includes a still another support, a further support, a further another support and a further still another support; said still another support being configured for receiving a remaining component of said tool (10), said remaining component being the one amongst the base (11), the elastically compressible body (12) and the polishing pad (13) which is not said one component and which is not said another component; said further support, further another support and further still another support being configured for receiving a further component, a further another component and a further still another component; said further component, further another component and further still another component being components of a tool to be manufactured different from the tool to be manufactured with said one component, said another component and said still another component.

11. A method according to any claim 2, wherein said glue applied onto said one surface of one component is left exposed to air for a time in the range of 2 to 4 seconds between each moment at which the transfer pad leaves said glue applying position and a successive moment at which the transfer pad arrives at said glue applying position.

12. A method according to any claim 3, wherein said glue applied onto said one surface of one component is left exposed to air for a time in the range of 2 to 4 seconds between each moment at which the transfer pad leaves said glue applying position and a successive moment at which the transfer pad arrives at said glue applying position.

13. A method according to any claim 2, wherein said transfer pad (38A, 39A, 38B, 39B) is driven along a same direction to said glue taking position and to said glue applying position.

14. A method according to any claim 3, wherein said transfer pad (38A, 39A, 38B, 39B) is driven along a same direction to said glue taking position and to said glue applying position.

15. A method according to any claim 4, wherein said transfer pad (38A, 39A, 38B, 39B) is driven along a same direction to said glue taking position and to said glue applying position.

16. A method according to claim 2, wherein said supporting device (20) includes another support configured for receiving said another component.

17. A method according to claim 3, wherein said supporting device (20) includes another support configured for receiving said another component.

18. A method according to claim 4, wherein said supporting device (20) includes another support configured for receiving said another component.

19. A method according to claim 5, wherein said supporting device (20) includes another support configured for receiving said another component.

20. A method according to claim 6, wherein said supporting device (20) includes another support configured for receiving said another component.

* * * * *